US010393296B2

(12) United States Patent
Quesada

(10) Patent No.: US 10,393,296 B2
(45) Date of Patent: Aug. 27, 2019

(54) SEALING GASKET WITH CORRUGATED INSERT FOR SEALING RESTRAINED OR NON-RESTRAINED PLASTIC PIPELINES

(71) Applicant: S & B Technical Products, Inc., Fort Worth, TX (US)

(72) Inventor: Guido Quesada, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

(21) Appl. No.: 15/661,234

(22) Filed: Jul. 27, 2017

(65) Prior Publication Data

US 2018/0094754 A1 Apr. 5, 2018

Related U.S. Application Data

(60) Provisional application No. 62/402,352, filed on Sep. 30, 2016.

(51) Int. Cl.

| | |
|---|---|
| ***F16J 15/12*** | (2006.01) |
| ***F16L 21/03*** | (2006.01) |
| ***F16L 21/08*** | (2006.01) |
| ***F16L 37/084*** | (2006.01) |

(52) U.S. Cl.

CPC ............ *F16L 21/03* (2013.01); *F16J 15/121* (2013.01); *F16L 37/0845* (2013.01); *F16L 21/08* (2013.01)

(58) Field of Classification Search

CPC ....... F16L 47/08; F16L 47/12; F16L 37/0845; F16L 21/03; F16J 15/121; F16J 15/122; F16J 15/166

See application file for complete search history.

(56) References Cited

U.S. PATENT DOCUMENTS 3,118,682 A * 1/1964 Fredd .................... F16J 15/166 277/584
4,214,764 A * 7/1980 Fava ...................... E21B 10/25 277/383
4,223,896 A * 9/1980 Strom .................... F16L 21/03 277/626
4,818,209 A * 4/1989 Petersson ............. B29C 57/025 425/392
5,094,467 A * 3/1992 Lagabe ............... F16L 37/0845 277/616
5,163,692 A * 11/1992 Schofield ............ F16J 15/3236 277/436
5,330,156 A * 7/1994 McKavanagh ....... F16K 3/0281 251/159
6,113,159 A * 9/2000 Corbett, Jr. ............ F16L 21/03 264/322

(Continued)

*Primary Examiner* — Nicholas L Foster

(74) *Attorney, Agent, or Firm* — Whitaker Chalk Swindle & Schwartz PLLC; Charles Gunter

(57) ABSTRACT

A pipe sealing gasket is shown which is designed to be received within a raceway provided within a socket end of a female bell plastic pipe end which is assembled with a mating male spigot pipe end to form a plastic pipe joint. The raceway in the female bell plastic pipe end is preformed during manufacture and the gasket is installed thereafter. The gasket has a rubber body portion which is reinforced by a hard corrugated ring-shaped insert. The hard corrugated ring-shaped insert acts to prevent extrusion of the gasket during a variety of pressure conditions as well as preventing displacement during field assembly.

3 Claims, 9 Drawing Sheets

(56) References Cited

U.S. PATENT DOCUMENTS

| | | | | |
|---|---|---|---|---|
| 6,488,319 | B2 * | 12/2002 | Jones | F16L 37/0845 285/104 |
| 7,055,829 | B2 * | 6/2006 | Russell | F16J 15/028 277/585 |
| 7,134,204 | B2 * | 11/2006 | Corbett, Jr. | F16L 37/0845 29/890.14 |
| 7,410,174 | B2 * | 8/2008 | Jones | F16L 21/08 277/615 |
| 7,455,301 | B2 * | 11/2008 | Ragsdale | F16J 15/122 277/627 |
| 7,618,071 | B2 * | 11/2009 | Jones | F16L 37/0845 285/307 |
| 8,066,843 | B2 * | 11/2011 | Ragsdale | F16J 15/122 156/308.2 |
| 8,096,561 | B2 * | 1/2012 | Eisenach | F16J 15/064 277/609 |
| 8,622,399 | B2 * | 1/2014 | Monteil | F16L 21/03 277/616 |
| 8,801,048 | B2 * | 8/2014 | Morris | F16L 37/091 285/340 |
| 9,085,101 | B2 * | 7/2015 | Guzowski | B29C 45/14065 |
| 9,568,127 | B2 * | 2/2017 | Morris | F16L 37/091 |
| 9,593,787 | B2 * | 3/2017 | Monteil | F16J 15/104 |
| 9,944,459 | B2 * | 4/2018 | Benet | B65D 53/02 |
| 2001/0045746 | A1 * | 11/2001 | Russell | F16J 15/028 285/105 |
| 2005/0040645 | A1 | 2/2005 | Jones | |
| 2005/0046189 | A1 * | 3/2005 | Corbett, Jr. | F16L 37/0845 285/374 |
| 2006/0220327 | A1 * | 10/2006 | Russell | F16J 15/121 277/611 |
| 2007/0063516 | A1 * | 3/2007 | Jones | F16L 37/0845 285/374 |
| 2007/0205566 | A1 * | 9/2007 | Ragsdale | F16J 15/122 277/628 |
| 2007/0273102 | A1 | 11/2007 | Schroeder et al. | |
| 2009/0243231 | A1 * | 10/2009 | Eisenach | F16J 15/064 277/630 |
| 2010/0059940 | A1 * | 3/2010 | Monteil | F16L 21/03 277/314 |
| 2012/0049409 | A1 * | 3/2012 | Guzowski | B29C 45/14065 264/279.1 |
| 2014/0374994 | A1 | 12/2014 | Monteil | |
| 2014/0374995 | A1 * | 12/2014 | Monteil | F16J 15/104 277/314 |
| 2015/0329284 | A1 * | 11/2015 | Benet | B65D 53/02 220/378 |
| 2016/0245436 | A1 * | 8/2016 | Monteil | F16L 17/035 |
| 2017/0370505 | A1 * | 12/2017 | Copeland | F16L 37/0845 |
| 2018/0252344 | A1 * | 9/2018 | Morris | F16L 17/025 |

* cited by examiner

SEALING GASKET WITH CORRUGATED INSERT FOR SEALING RESTRAINED OR NON-RESTRAINED PLASTIC PIPELINES

CROSS REFERENCE TO RELATED APPLICATIONS

The present application claims priority from a previously filed provisional application Ser. No. 62/402,352, filed Sep. 30, 2016, entitled "Sealing Gasket With Corrugated Insert For Sealing Restrained or Non-Restrained Plastic Pipelines", by the same inventor.

BACKGROUND OF THE INVENTION

1. Field of the Invention

The present invention relates generally to sealing gaskets and sealing systems used for pipe joints in plastic pipelines in which a male spigot pipe section is installed within a mating female socket pipe section to form a pipe joint. In some cases, the sealing gasket also acts as a part of a restrained joint system for the pipe joint.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove or "raceway" formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Prior art pipe gasket sealing systems are known in which a homogeneous rubber gasket was generally deformable, allowing it to be flexed or bent by hand, accepting inverse curvature, and inserted within a mating internal raceway formed in the female, belied pipe end. The raceway in the female pipe bell end was pre-formed using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring for the gasket body, with a stiffening band which was inserted into a mating groove provided on the internal diameter of the rubber ring.

In the other prior art systems, a homogeneous rubber gasket body was bonded with an internal or external metal, or plastic, reinforcing band or an internal metal band or ring. Each of these solutions had critical limitations. For example, the prior art plastic/rubber composites sometimes allowed the infiltration of dirt and debris between the bell raceway and the outer diameter of the gasket. The plastic region in some cases, reduced the rubber surface contact area, sometimes leading to problems in providing the needed sealing in all conditions, including high pressure, low pressure and cyclic surges. Compatible materials were necessary when bonding the homogeneous rubber gasket body with the plastic reinforcing band. Poor bonding resulted in separation of the two elements. The reinforcing band was subject to being misplaced and breakage in the two part system. Thus, in some cases, the prior art solutions failed to provide the needed joint integrity, often contributing to the complexity and expense of the manufacturing operation and field installation.

In the case of those prior art gaskets using metal inserts, the insert is placed inside the rubber mold cavity, typically with pins or other supports used to keep the insert in the proper position during the injection molding operation. The insert was made before the rubber injection to the final dimension of the intended seal. As a result, the metal insert design did not take into account shrinkage of the injected rubber during curing. Due to rubber shrinkage, the mold cavity is typically about 2.5% larger than the final product. Since the insert design does not take into account this shrinkage and given the final product dimensions, the insert may not fit properly in the enlarged injection cavity. If the insert is adjusted to fit in the cavity, then it prevents the shrinkage of the rubber to the final dimensions. This conflict makes it difficult to achieve the desired product dimensions.

The conflict between the insert dimensions and rubber shrinkage during the molding operation is particularly problematic in the case of plastic inserts. The plastic insert was intended to extend to the outer surface of the seal where regions thereof mate with the inside surface of the socket groove of the female, belled pipe end. The insert was also intended to extend to an inner surface of the seal which mates with the outer surface of the spigot pipe end. As a result, there was no room for enlargement of the rubber injection cavity.

Applicant's co-pending application Ser. No. 15/092,174, filed Apr. 6, 2016, and its parent application Ser. No. 13/923,468, filed Jun. 21, 2013, the disclosure of which is hereby incorporated by reference in its entirety, both show a plastic insert which is intended to address certain of the above deficiencies. The plastic insert shown in those cases comprises a circular array of segments which are connected by a relatively thin band. This particular insert eliminated the need for mounting pins in the mold and offered increased sealing contact area with the bell and spigot pipe ends, as discussed above. However, the nature of the succession of thin and thick sections could produce problems in injection molding. Also, if the insert cannot stretch to fit in the expanded mold cavity, rubber shrinkage over a non-shrinking insert can produce different shrinkage in different directions and make the resulting shrinkage difficult to predict. Also, there is a need in some situations to have the gasket with the plastic insert act as a joint restraint.

The present invention has, as one object, to provide an improved pipe gasket for use in pipe joints which allows the gasket to accept inverse curvature, to be installed in a preformed groove by hand, either at the manufacturing plant or in a field operation.

Another object is to provide a gasket with a plastic insert which is shaped so that it naturally finds its position in the mold cavity without the necessity of positioning pins or the like.

Another object of the invention is to provide an improved gasket which is securely retained within a preformed pipe groove without the necessity of a separate retaining band.

Another object of the invention is to provide an improved sealing gasket of the plastic/rubber variety which optimizes the rubber sealing surface contact of the gasket with the pipe bell raceway.

Another object of the invention is to provide a reinforcing element that is not required to be bonded to the rubber element, hence creating the possibility of being made from a multitude of materials.

Another object of the invention is to provide such a sealing gasket with special reinforcing attributes which allow it to seal under a variety of pressure conditions without being twisted or extruded, or displaced during field assembly, and yet which can be installed by hand in the bell raceway.

Another object of the invention is to provide such a sealing gasket which also has properties which allow it to be used as a part of a joint restraint system in a plastic pipe sealing system.

SUMMARY OF THE INVENTION

The sealing gasket of the invention is a specially reinforced design which is especially useful in sealing PVC pipes having bell ends made using collapsible mandrel tools. Pipelines of this general type are often used in municipal water and sewage lines, as well as in a variety of other applications. The gasket has a main rubber body portion which is reinforced by a hard corrugated ring-shaped insert. The insert is preferably imbedded within the main rubber body portion of the gasket during the molding of the gasket, avoiding the use of bonding elements. The rubber portion of the gasket provides the primary sealing capacity while the hard corrugated ring-shaped insert improves resistance to extrusion due to water pressure and displacement during field assembly. The gasket accepts inverse curvature to allow easy installation in a pre-formed female pipe bell raceway by hand. It can be installed by the pipe manufacturer, or afterward in a field assembly. The main rubber portion of the gasket can be, for example, styrene butadiene rubber (SBR), ethylene propylene diene rubber (EPDM), acrylonitrile-butadiene rubber (NBR), nitrile rubber, etc. The hard corrugated ring-shaped insert can be formed of a hard plastic or a suitable metal.

In one preferred form, a pipe sealing gasket is shown which is designed for receipt within a raceway provided within a female bell socket end of a thermoplastic pipe. The female bell socket end is designed to receive a mating male thermoplastic spigot pipe end to form a pipe joint. In a first form, the gasket comprises a ring shaped elastomeric body having a main body portion formed of rubber which, when viewed in cross section, includes a leading nose region, a lower compression region and a trailing tail region, the leading nose region facing generally towards the female socket end of the pipe once the gasket is inserted within the raceway of the female bell socket end of the pipe.

The leading nose region of the main body portion of the gasket is reinforced by a hard ring-shaped band which, in one form is comprised of a hard plastic, such as an engineered plastic material. The hard plastic band further comprises a corrugated ring member formed as a series of interconnected alternating crest and root regions, the hard plastic band being embedded within the leading nose region of the main body portion of the gasket during gasket manufacture. The hard plastic band acts to prevent extrusion of the gasket from the raceway provided in the female bell socket end of the thermoplastic pipe once a spigot end of a mating male pipe is installed to form a pipe joint.

The main body portion of the gasket can be formed of a natural or synthetic rubber, for example, a rubber selected from the group consisting of styrene butadiene rubber, ethylene propylene diene monomer rubber and nitrile rubber. The hard plastic band is formed of a synthetic plastic material having a durometer which is greater than the durometer of the main body portion of the gasket while being flexible enough to allow the gasket to accept inverse curvature during installation into the raceway provided in the female bell socket end of the thermoplastic pipe.

The corrugated ring member with its alternating crest and root regions is stretchable from an initial relaxed diameter to an expanded diameter which allows it to be stretched when placed into an injection mold cavity. The sealing gasket has an outer conical surface which mates with walls of the raceway provided in the female belled pipe end. The alternating crest and root regions define a generally conical loci of points on an exterior region of the hard plastic band and a generally cylindrical loci of points on an interior region of the hard plastic band. The crest regions of the corrugated ring member are exposed from the conical surface of the sealing gasket after manufacture at regular spaced intervals, contact between the exposed corrugated ring member and the raceway walls acting to prevent extrusion of the sealing gasket from the raceway.

Also, the corrugated ring member with its alternating crest and root regions is stretchable from an initial relaxed diameter to an expanded diameter which allows it to be stretched when placed into an injection mold cavity and yet return elastically to an intended diameter as surrounding rubber in the mold cavity shrinks during an injection molding operation.

The lower compression region of the gasket can be provided with a series of circumferential engagement grooves for engaging the mating male spigot pipe end. Similarly, the main gasket body can be provided with a series of circumferential engagement grooves for engaging the female socket end of the pipe. In use, hydraulic pressure due to fluid in the pipe acts upon the alternating crest and root regions of the hard plastic band to push the alternating crest and root regions into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid. Also, in some cases, pressure in the rubber in the main body portion of the sealing gasket and fluid pressure in the pipe pushes the exposed crest regions of the corrugated ring member in the direction of the mating male spigot pipe end, thereby acting as a restraint mechanism for a pipe joint.

In another form of the invention, the ring shaped elastomeric body again is formed of rubber which, when viewed in cross section, includes a leading nose region, a lower compression region and a trailing tail region. In this case, however, the leading nose region of the main body portion of the gasket is reinforced by a corrugated metal insert instead of a hard plastic insert. The corrugated metal insert comprises a corrugated ring member formed as a series of interconnected alternating scallop regions, the corrugated metal insert being embedded within the leading nose region of the main body portion of the gasket during gasket manufacture. The corrugated metal insert acts in a similar fashion to the previously described hard plastic insert in preventing extrusion of the gasket from the raceway provided in the female bell socket end of the thermoplastic pipe once a spigot end of a mating male pipe is installed to form a pipe joint.

In the case of the second form of the invention, the corrugated metal insert is also stretchable, allowing it to be stretched when inserted into an injection mold cavity during an injection molding operation. In one preferred form, the corrugated metal insert is made of steel, whereby the greater relative hardness of the steel insert enables it to indent the mating surface of the mating male spigot pipe end during assembly of a pipe joint. In other words, the corrugated steel insert itself creates a groove on the mating surface of the mating male spigot pipe end which acts as a joint restraint in use. Even though the ring-shaped metal insert is formed of a material such as steel, the corrugated nature of the insert makes it flexible enough to allow the gasket to accept inverse curvature during installation into the raceway provided in the female bell socket end of the thermoplastic pipe.

Additional objects, features and advantages will be apparent in the written description which follows.

DETAILED DESCRIPTION OF THE INVENTION

Figure 1:
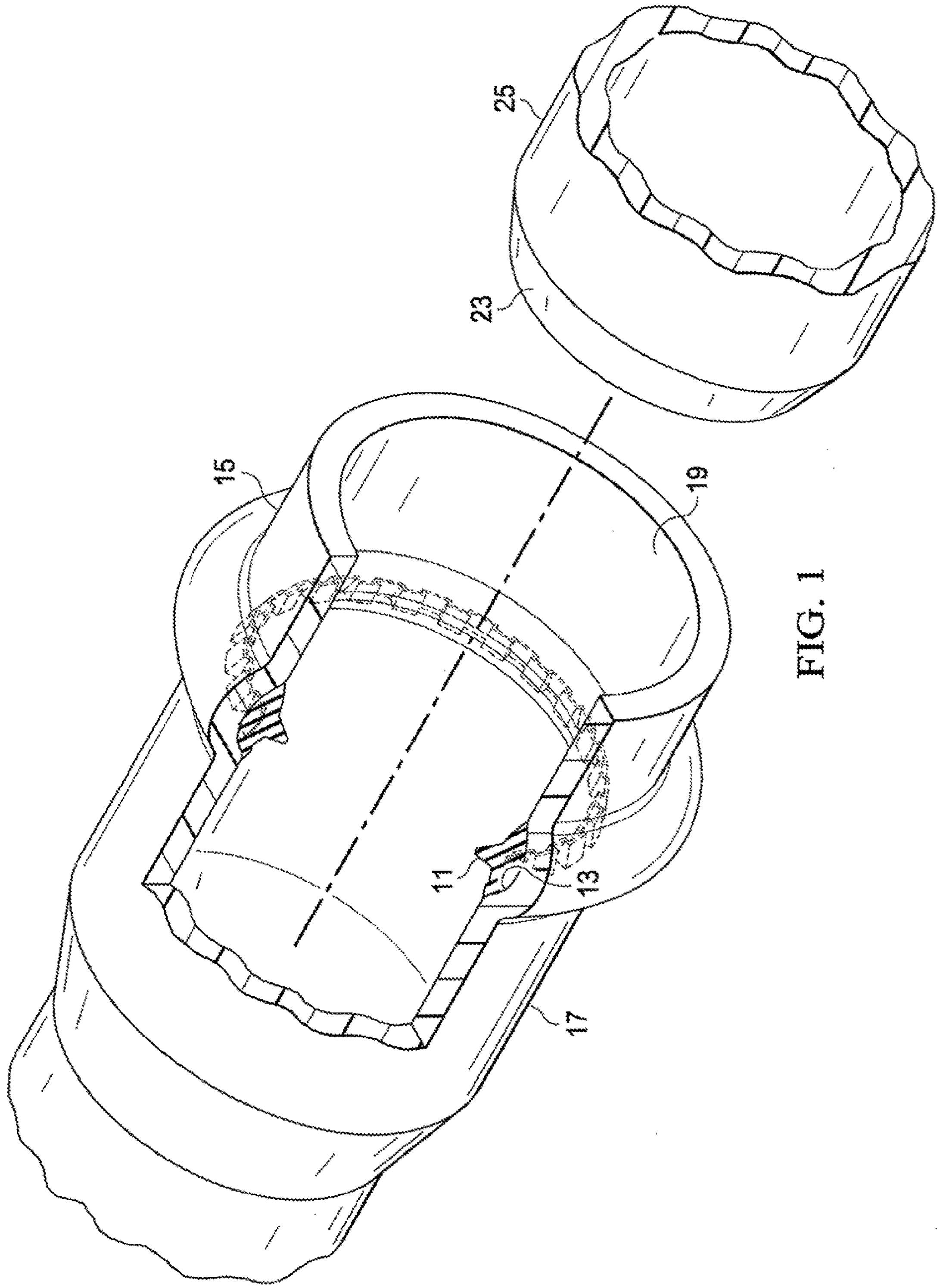
FIG. 1 is an end view of a section of plastic pipe, partly broken away, and showing the female, bell end and groove or raceway, with a gasket of the invention in place in the raceway, the male spigot pipe section being position for insertion into the bell.

Turning now to the attached illustrations, FIG. 1 shows the gasket 11 of the invention in place prior to the assembly of a pipe joint. The gasket 11 is installed within a groove or raceway 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials. As has been mentioned, thermoplastic pipes of this general type are used in a variety of industrial settings including water, sewage and chemical industries. The female, belled end 15 of the thermoplastic pipe section has a mouth opening 19 which is engageable with a male spigot end 23 of a mating male pipe section 25 to form a pipe joint. The gasket receiving raceway 13 has been pre-formed in the pipe mouth opening 19 at the pipe manufacturing facility, as by using a collapsible mandrel belling tool.

Figure 2:
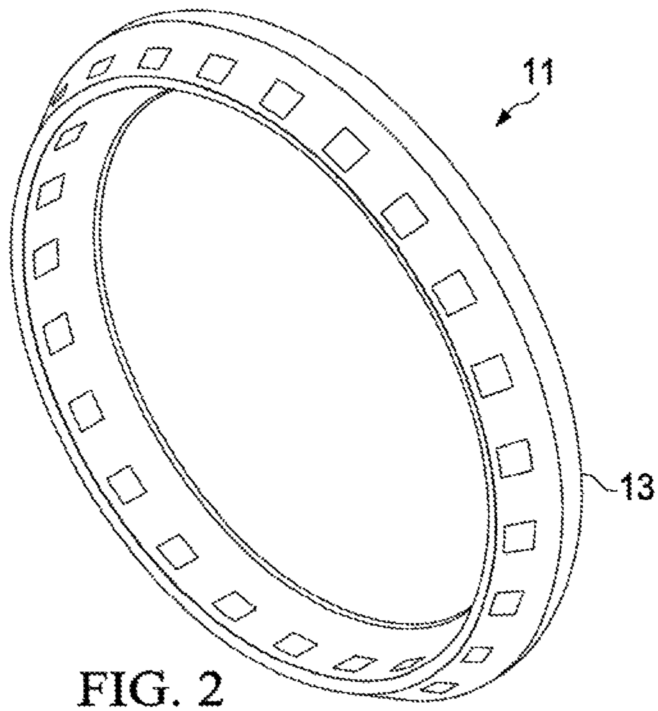
FIG. 2 is a perspective view of the sealing gasket of the invention with its corrugated reinforcing band, showing the alternating, exposed regions of the reinforcing band.

A particularly preferred form of the gasket 11 which can be used in the method of the invention is shown in profile in FIG. 2. Preferably, the gasket 11 is an annular, ring-shaped member having a main gasket body 13 formed of a flexible elastomeric material, such as a suitable natural or synthetic rubber. The elastomeric material used to form the body 13 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc.

Figure 8:
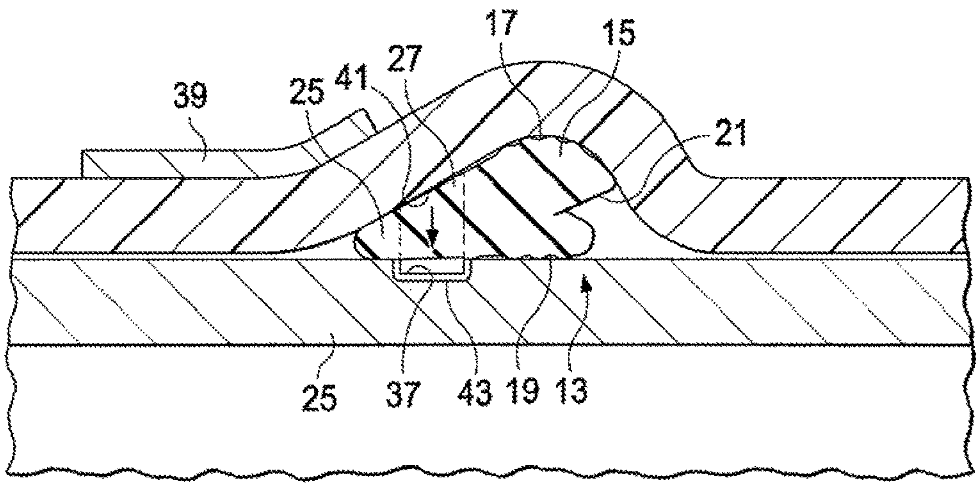
FIG. 8 is a partial, quarter sectional view of the beginning step of the make-up of a pipe joint with the male pipe end having been inserted into the female, belled pipe end, the male pie end having made contact with the sealing gasket of the invention
Figure 9:
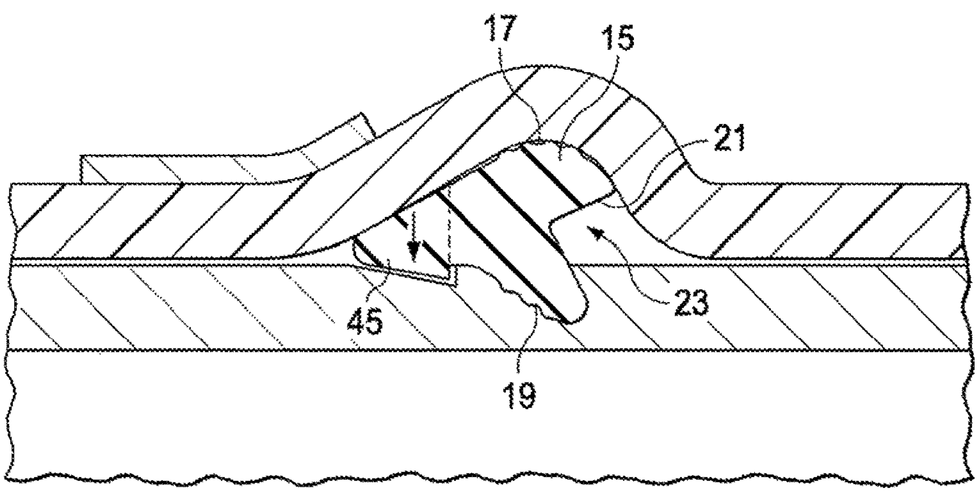
FIG. 9 is a view similar to FIG. 8, showing the further movement of the male pipe end within the female, belled pipe end of the pipe joint.
Figure 10A:
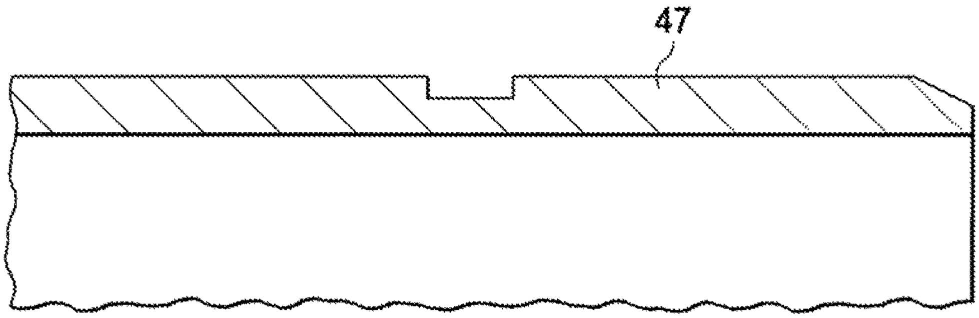
FIGS. 10A-10C and 11A-11C are different concepts for a grooved spigot pipe end for use with the gasket of the invention in providing a restrained pipe joint.
Figure 10B:
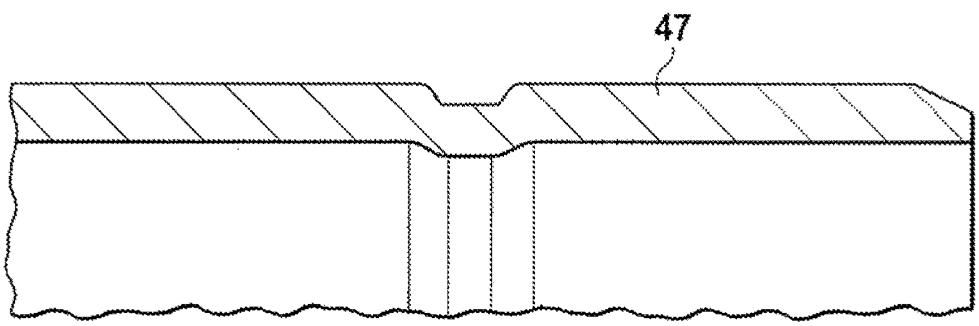
Figure 10C:
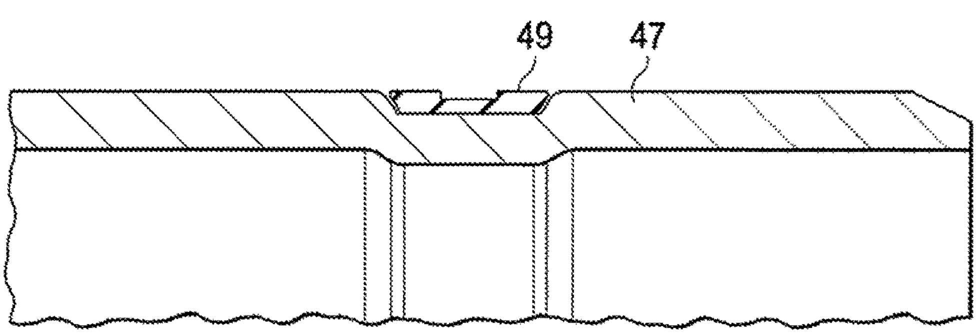

Turning now to FIGS. 8 and 9, the main gasket body 13 includes an outer convex sealing surface 15 which, in this case, is provided with a series of ribs or serrations 17. The main gasket body also includes a lower, primary sealing surface 19. In the preferred embodiment shown, the primary sealing surface 19 is an evenly sloping face of the gasket body which forms a combination lip and compression seal region for the gasket. The primary sealing surface 19 is separated from the outer convex sealing surface 15 and trailing tail portion 21 by a V-shaped recess (shown generally as 23 in FIG. 9). The V-shaped recess allows the lip region of the gasket body to bend inwardly as the mating male, spigot end of a mating pipe section encounters the primary sealing surface 19 of the gasket (see FIGS. 8-9).

Returning to FIG. 8, the main gasket body 13 also has a leading nose region, designated generally as 25 in FIG. 8 which is initially contacted by the mating male spigot pipe end during the assembly of the pipe joint. The leading nose region 25 faces generally towards the female socket end of the pipe once the gasket is inserted within the pipe.

Figure 3:
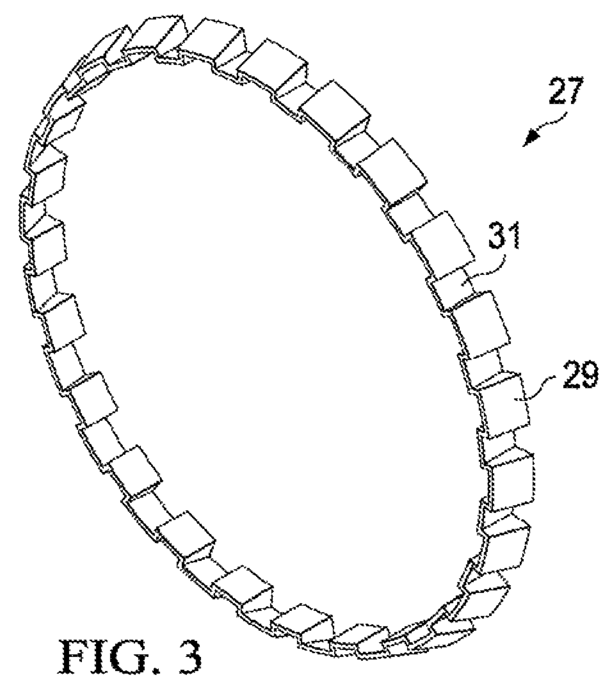
FIG. 3 is an isolated, perspective view of the corrugated reinforcing band used in the gasket of FIG. 2.

With reference now to FIGS. 2 and 3, it will be appreciated that the leading nose region of the gasket is reinforced by a hard plastic band (designated generally as 27 in FIG. 3). The hard plastic band comprises a corrugated ring member formed as a series of interconnected alternating crest and root regions (such as regions 29, 31 in FIG. 3). The hard plastic band is embedded within the leading nose region of the main body portion of the gasket during gasket manufacture. The hard plastic band acts to prevent extrusion of the gasket from the raceway provided in the female bell socket end of the thermoplastic pipe once a spigot end of a mating male pipe is installed to form a pipe joint.

By "embedded within the leading nose region of the main body portion of the gasket" is meant that the hard plastic band is incorporated within the surrounding main rubber portion of the sealing gasket during manufacture, as in an injection molding operation. Only selected spaced regions (such as regions 33, 35 in FIG. 2) are exposed from the otherwise homogeneous main rubber body of the gasket. The hard plastic corrugated band is typically placed within a mold cavity and rubber is then injected into the cavity under suitable temperature and pressure conditions and allowed to cure.

One advantage of the ring-shaped corrugated band of the invention is that it is generally not necessary to have pins or other positioning means in the injection mold, as was the case with prior art solid metal rings, and the like.

A number of materials can be used for the main body portion of the gasket, such as natural or synthetic rubbers. Preferably, the main body portion of the gasket is formed of a rubber selected from the group consisting of styrene butadiene rubber, ethylene propylene diene monomer rubber and nitrile rubber. The durometer of the rubber used for the main gasket body may vary depending on the end application but will typically be in the range from about 40-70 Shore A hardness, preferably about 40-60 Shore A. The hard plastic band 37, on the other hand, is formed of a synthetic plastic material having a durometer which is greater than the durometer of the main body portion of the gasket. The synthetic plastic material used for the band is preferably a material which shows an appropriate stiffness for the application at hand while allowing flexing (accepts inverse curvature) during installation. The band can have a higher durometer than the remaining main body portion of the gasket since it does not participate in the sealing function of the gasket to the same extent as the primary sealing region of the gasket.

Various hard plastic type materials may be suitable candidates for use as the hard plastic band. These materials include such materials as polypropylene, polyvinylchloride and various "engineered plastics." For example, one such material is those hard plastics which fall into the family group of modified polyphenylene ethers (PPE). These commercially available materials have high heat resistance, making them suitable for injection or compression molding and are generally suitable for plastic/rubber composites. One commercially available family is the VESTORAN® family of materials. VESTORAN® is the registered trademark of Evonik Degussa GmbH for molding compounds containing poly-2,6-dimethyl-1,4-phenylene ether as polymeric constituent (poly-phenylene ether, PPE, also referred to as PPO).

In addition to the selection of an engineered plastic material which is sufficiently flexible to accept inverse curvature during the gasket installation process, the corrugated nature of the hard plastic ring member with its alternating crest and root regions is also stretchable from an initial relaxed diameter to an expanded diameter which allows it to be stretched when placed into an injection mold cavity.

Applicant has briefly described the conflict which exists due to rubber shrinkage in the mold cavity during the gasket manufacturing operation. The mold cavity is typically about 2.5% larger than the final product. Since the traditional insert design did not take into account this shrinkage and given the final product dimensions, the insert may not fit properly in the enlarged injection cavity. If the insert is adjusted to fit in the cavity, then it prevents the shrinkage of the rubber to the final dimensions. This conflict makes it difficult to achieve the desired product dimensions.

This conflict between the insert dimensions and rubber shrinkage during the molding operation is particularly problematic in the case of plastic inserts where the insert was intended to extend to the outer surface of the seal where regions thereof mate with the inside surface of the socket groove of the female, belied pipe end. The plastic insert was also intended to extend to an inner surface of the seal which mates with the outer surface of the spigot pipe end. As a result, there was no room for enlargement of the rubber injection cavity.

The corrugated nature of the plastic inserts of the invention allow them to be stretched from an initial design diameter, or relaxed diameter, to fit an expanded diameter which will fit in the expanded rubber cavity. The corrugated plastic insert returns elastically to its intended final diameter as the rubber region of the gasket body shrinks during molding. The term "corrugated" is intended to describe an object in the usual sense of the word, namely, an object having a series of parallel ridges and furrows, such as is commonly found in corrugated fiberboard and corrugated cardboard. With reference to FIG. 3, Applicant has used the terms crest regions 29 and root regions 31 to describe the "corrugated" nature of the ring-shaped plastic band 27.

As will also be appreciated from FIGS. 2 and 3, the finished sealing gasket has an outer conical surface which is intended to mate with walls of the raceway provided in the female belied pipe end. The crest regions 29 of the corrugated ring member are exposed from the conical surface of the sealing gasket after manufacture at regular spaced intervals, contact between the exposed corrugated ring member and the raceway walls acting to prevent extrusion of the sealing gasket from the raceway. The exposed regions of the corrugated plastic insert can be clearly seen in FIG. 2 of the drawings. The exposed regions are also indicated at 33 and 35 in FIG. 5.

Figure 4:
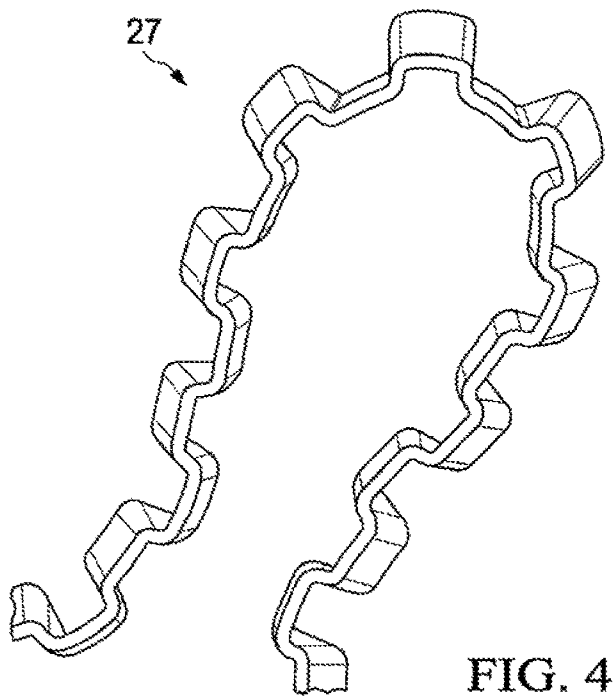
FIG. 4 is a partial, perspective view of the corrugated reinforcing band of the invention, showing the flexible and stretchable nature of the plastic band.
Figure 5:
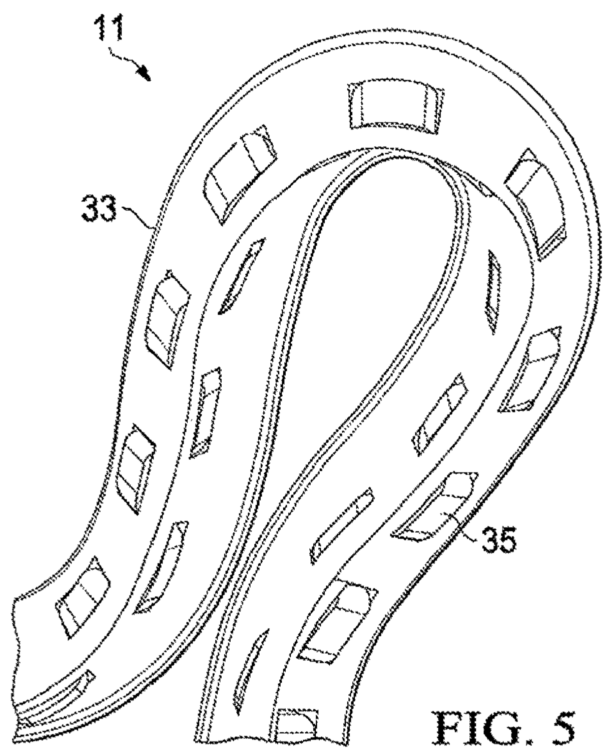
FIG. 5 is a close-up view of a portion of the reinforcing band of the invention, showing the alternative, exposed regions of the corrugated reinforcing band.

FIGS. 4 and 5 are intended to illustrate the extended flexibility of the corrugated plastic inserts of the invention. The corrugated profile provides a much longer effective distance for the insert to bend while preserving relatively thick and strong gasket walls. The added flexibility of the corrugated nature of the insert make the gasket easier to install in the raceway provided in the female, belled pipe end.

Figure 6:
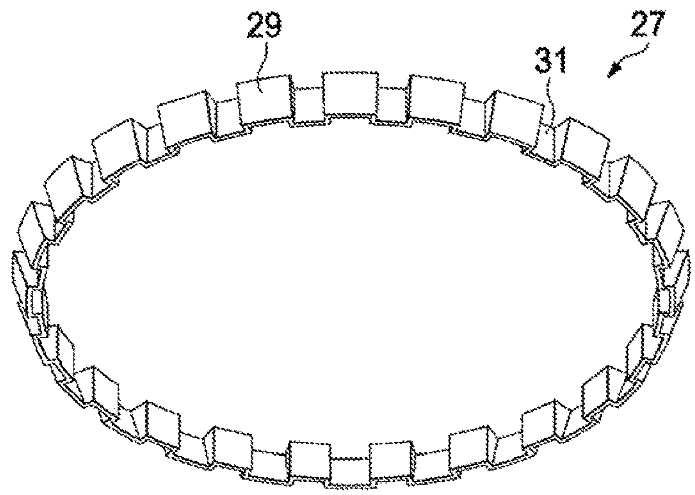
FIG. 6 is another isolated, perspective view of the corrugated reinforcing band of the invention, taken from a different angle than the perspective view of FIG. 3.
Figure 7:
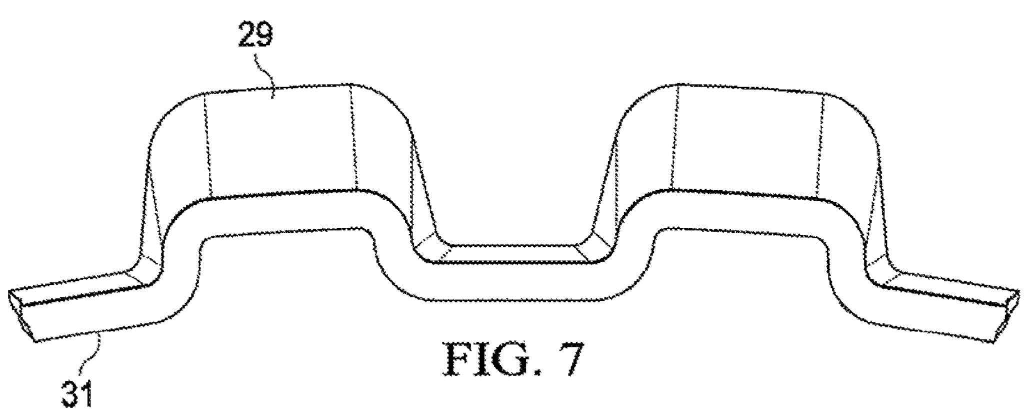
FIG. 7 is an isolated view of a portion of the corrugated reinforcing band of FIG. 6, showing the alternating raised and depressed crest and root regions thereof.

FIGS. 6-7 show further details of the nature of the corrugations in the rigid plastic insert. It will be appreciated that the alternating crest and root regions 29, 31, define a generally conical loci of points on an exterior region of the hard plastic band and a generally cylindrical loci of points on an interior region of the hard plastic band. The outer "conical" loci or points made up by the crest regions mate with the raceway surface of the belled pipe end to prevent seal extrusion in use. The inner "cylindrical" loci of points mate with the male spigot pipe surface to provide radial support against radial reaction from the groove under pressure. It will also be appreciated from FIG. 7 that the plastic ring has generally uniform wall thickness which simplifies the injection molding process.

In some cases, the sealing gaskets of the invention can also serve as a joint restraint system. The nature of the corrugated plastic inserts enable a joint restraint system with, for example, Anger™ 30/60 sockets widely used by pipe manufacturers. In some cases, a two way restraint system can be provided, preventing pipe pull-out and pipe overinsertion. With reference to FIG. 8, a sealing gasket of the invention provided with the corrugated plastic insert 27 is shown engaging an external groove 37 provided on the exterior surface of the male, spigot pipe end 25. Pressure in the rubber of the main gasket body from the gasket installation, together with fluid pressure in the pipe push the exposed regions of the insert into the groove 37. Additional load capacity can be provided with an external reinforcing band (band 39 in FIG. 8), or the like. Note also that in the case of the plastic insert in FIG. 8, more rounded edges 41 on the socket side and sharper edges 43 on the spigot side promote initial exposure of the engaging side as the rubber shrinks. The machined groove 37 in the spigot end provides control over stress concentration by applying rounds at stress concentrating edges.

FIG. 9 shows another restraint system which operates as a one-way joint restraint to prevent pipe pull-out. Here, the internal surfaces 45 of the insert are conical instead of cylindrical so that the insert engages with a triangular groove provided on the exterior surface of the male spigot pipe end.

Figure 11A:
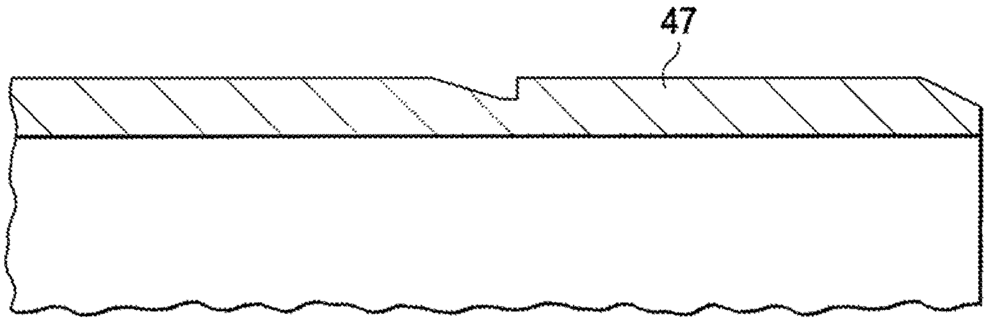
Figure 11B:
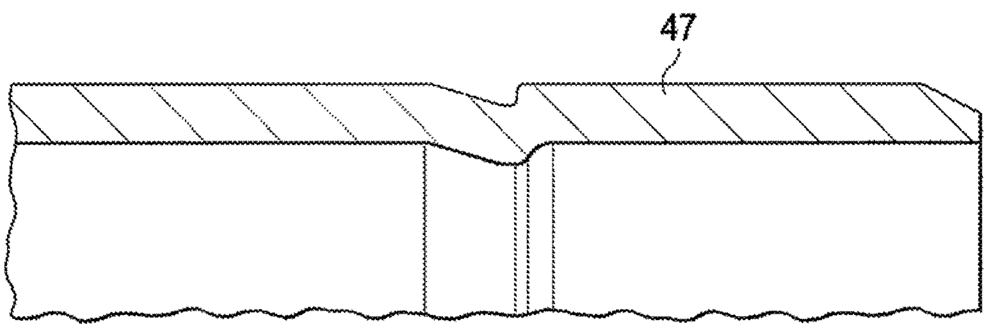
Figure 11C:
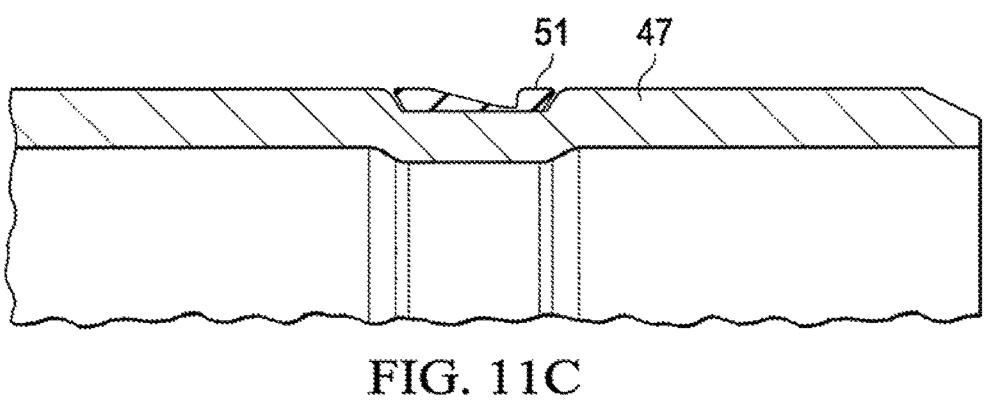

FIGS. 10A-11C show various alternatives for a grooved spigot which could be used with the restraint system of the invention. A machined groove (FIGS. 10A and 11A) is probably the simplest approach and can be performed together with, for example, chamfering the spigot pipe end (47 in FIG. 10A). FIGS. 10B and 11B show a groove which is formed by using, for example, an internal protrusion in a batch PVCO mold where the pipe is being expanded. FIGS. 10C and 11C show a plastic or metal casing 49, 51 placed in a groove on the spigot for added strength and accurate groove shape. The casing could be placed in a batch PVCO mold where the pipe is being expanded.

Figure 12:
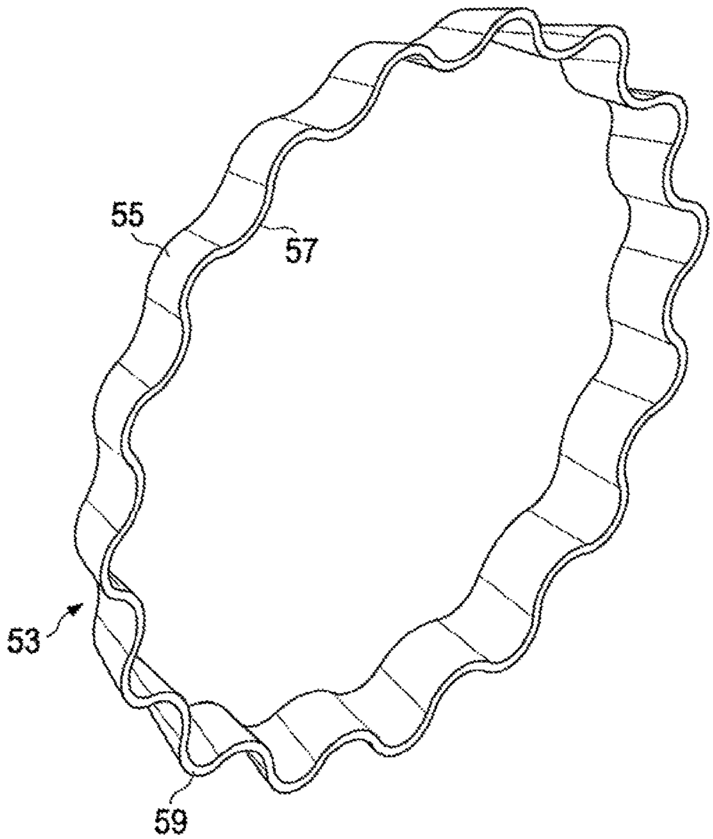
FIG. 12 is another type of reinforcing band, made of metal for use in a sealing and restraining gasket for plastic pipe of the invention.
Figure 12A:
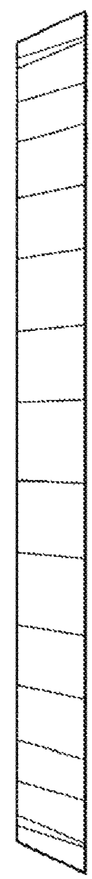
FIG. 12A is a side, partial cross section view of the gasket of FIG. 12.
Figure 13:
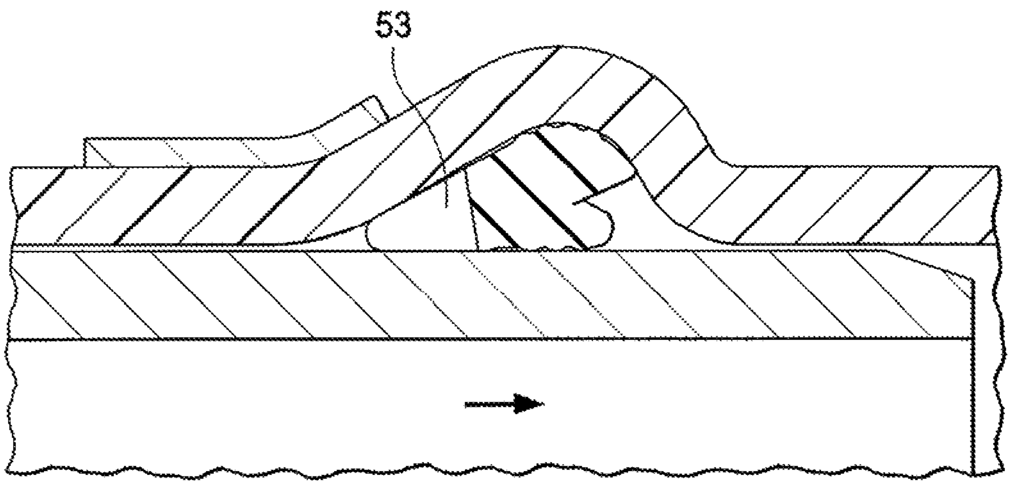
FIGS. 13 and 14 illustrate the make-up of a pipe joint using a sealing gasket reinforced with the metal band of FIG. 12.
Figure 14:
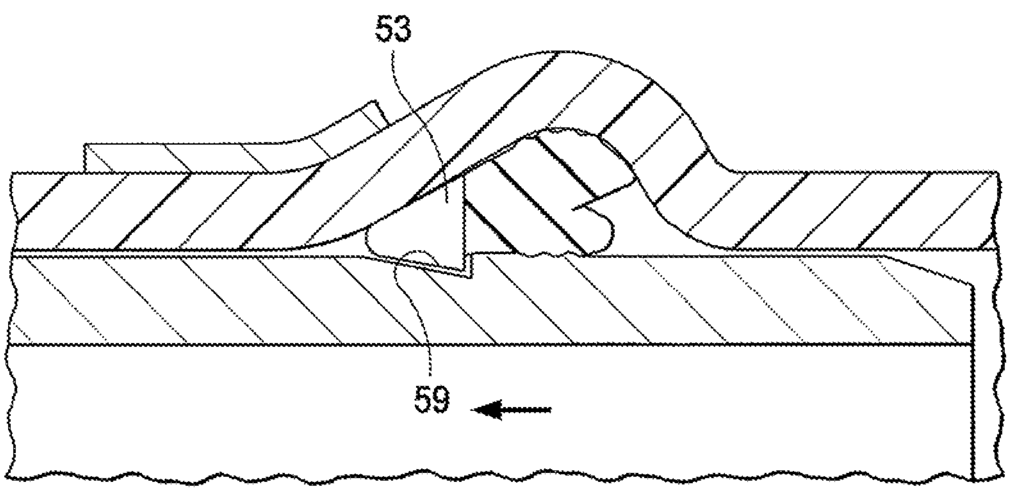

FIGS. 12-14 illustrate another form of the invention in which the corrugated ring-shaped insert is provided in the form of a corrugated ring member 53 formed as a series of interconnected alternating scallop regions (such as regions 55, 57 in FIG. 12). In this case, the corrugated insert 53 is formed from metal, rather than plastic and can be manufactured, as by stamping a steel band. The corrugated metal insert is again embedded within the leading nose region of the main body portion of the gasket during gasket manufacture. As with the plastic band, the corrugated metal insert 53 acts to prevent extrusion of the gasket from the raceway provided in the female bell socket end of the thermoplastic pipe once a spigot end of a mating male pipe is installed to form a pipe joint.

The term "scallop" regions 55, 57 is used in the usually understood meaning, that is, "a series of rounded projections (or the notches between them) formed by curves along an edge (as the edge of a leaf or piece of cloth or the margin of a shell" (Wikipedia definition). Even though the scalloped corrugated band 53 is formed of metal, it will still stretch to fit in an expanded rubber cavity of an injection mold, as described with respect to the plastic band. However, unlike the plastic band, the corrugated metal insert being formed of steel with its greater relative hardness enables it to indent the mating surface of the mating male spigot pipe end during assembly of a pipe joint. This action is illustrated in FIGS. 13 and 14 of the drawings with the metal insert 53 forming an indentation 59 in the outer surface of the male, spigot pipe end during the joint assembly. This allows the sealing gasket with the metal insert to also act as a restraint system for the pipe joint. The corrugated metal insert is also flexible to the extent that it is flexible enough to allow the gasket to accept inverse curvature during installation into the raceway provided in the female bell socket end of the thermoplastic pipe.

The extended corrugated length of the "scalloped" band provides extra flexibility needed to buckle and install sealing gaskets in a triangular (Anger™ 30/60 pipe groove. The outer lobes of the scallops (such as lobe 59 in FIG. 12) typically lean at about a 30° angle against the socket groove surface. The conical inner envelope makes the insert nonconforming on the spigot. That is, the profile needs to rotate to let the spigot in but will tend to rotate back when pressure is applied and the spigot moves out. This put s concentrated loads on the spigot at the inner edge s of the lobes. The insert itself creates the groove on the spigot for engagement of the joint restraint.

FIGS. 13 and 14 illustrate the assembly action in schematic fashion. In FIG. 13, the insert rotates backward to some extend to allow the spigot into the belled pipe end. There is some backward displacement as well. The corrugated geometry provides flexibility to allow this rotation but also produces a spring-back reaction that promote engagement of the restraint. In FIG. 14, the insert rotates back to its natural position. This action causes the inner edges to indent the spigot Further displacement completes the engagement.

An invention has been provided with several advantages. The method for installing a gasket of the invention allows a pipe gasket to be installed within a preexisting and preformed groove in a thermoplastic pipe. Once the gasket has been secured in position in snap-fit fashion, it is securely retained within the pipe raceway and resists axial forces tending to displace the gasket from the raceway. Because a gasket is inserted within a preformed pipe groove or raceway, the manufacturing and installation processes are simplified and made less costly. The design of the gasket also makes it possible to remove one gasket and reinstall another within a preformed raceway in the selected pipe end. The gasket which is utilized in the process is simple in design and relatively economical to manufacture. There is no need for an external retaining band or an internal metal ring to assist in securing the gasket within the pipe groove. It is also possible to eliminate the pins necessary to hold a solid metal band or ring in place inside the mold during manufacture, as in the previous Reiber gasket art. The corrugated band acts to prevent extrusion of the gasket from the female pipe groove under a variety of fluid pressure situations, or from being displaced during field assembly.

While the invention has been shown in only one of its forms, it is not thus limited but is susceptible to various changes and modifications without departing from the spirit thereof.

What is claimed is:

1. A pipe sealing gasket designed for receipt within a raceway provided within a female belled socket end of a thermoplastic pipe, whereby fitting the gasket within the raceway allows a mating male pipe having a spigot pipe end to be inserted therein to form a continuous pipe joint, the gasket comprising:

a ring shaped elastomeric body having a main body portion formed of rubber which, when viewed in cross section, includes a leading nose region, a lower compression region and a trailing tail region, the leading nose region capable of facing generally towards the female socket end of the pipe once the gasket is inserted within the raceway of the female bell socket end of the pipe;

wherein the leading nose region of the main body portion of the gasket is reinforced by a hard plastic band, the hard plastic band comprising a corrugated ring member formed as a series of interconnected alternating crest and root regions, the hard plastic band being embedded within the leading nose region of the main body portion of the gasket during gasket manufacture;

wherein the alternating crest and root regions define a generally conical area on an exterior region of the hard plastic band and a generally cylindrical area on an interior region of the hard plastic band, the alternating crest and root regions also defining an entire circumference of the hard plastic band, and wherein the hard plastic band has a uniform wall thickness about the entire circumference thereof;

wherein hydraulic pressure due to fluid in the pipe acts upon alternating the crest and root regions of the hard plastic band to push the alternating crest and root regions into tighter engagement with the mating male and female pipe members to prevent extrusion of the gasket from the raceway provided in the female belled socket end of the thermoplastic pipe once a spigot end of a mating male pipe is installed to form a pipe joint and the pipe is conveying fluid; and wherein the corrugated ring member with its alternating crest and root regions is stretchable from an initial relaxed diameter to an expanded diameter which allows it to be stretched when placed into an injection mold cavity and yet return elastically to an intended diameter as surrounding rubber in the mold cavity shrinks during an injection molding operation.

2. The pipe sealing gasket of claim 1, wherein the sealing gasket has an outer conical surface for mating with walls of the raceway provided in the female belled pipe end, and wherein the crest regions of the corrugated ring member are exposed from the conical surface of the sealing gasket after manufacture at regular spaced intervals, and wherein the exposed corrugated ring member is for contact with the raceway walls and for preventing extrusion of the sealing gasket from the raceway.

3. The pipe sealing gasket of claim 2, wherein the exposed crest regions of the corrugated ring member are capable of acting as a restraint mechanism for a pipe joint.

* * * * *